(12) United States Patent
Rogers

(10) Patent No.: US 11,471,919 B2
(45) Date of Patent: Oct. 18, 2022

(54) APPARATUS AND METHOD FOR WASHING CONTAMINATED MATERIAL, AND GLASS CULLET PRODUCED THEREBY

(71) Applicant: Aquavitrum Limited, Barnsley (GB)

(72) Inventor: Paul Alan Rogers, Romsey (GB)

(73) Assignee: AQUAVITRUM LIMITED, Barnsley (GB)

(*) Notice: Subject to any disclaimer, the term of this patent is extended or adjusted under 35 U.S.C. 154(b) by 53 days.

(21) Appl. No.: 14/761,563

(22) PCT Filed: Jan. 16, 2014

(86) PCT No.: PCT/GB2014/000012
§ 371 (c)(1),
(2) Date: Jul. 16, 2015

(87) PCT Pub. No.: WO2014/111678
PCT Pub. Date: Jul. 24, 2014

(65) Prior Publication Data
US 2015/0336136 A1 Nov. 26, 2015

(30) Foreign Application Priority Data

Jan. 16, 2013 (GB) .................................... 1300756

(51) Int. Cl.
*B08B 3/02* (2006.01)
*B08B 3/14* (2006.01)
(Continued)

(52) U.S. Cl.
CPC .................. *B08B 3/02* (2013.01); *B03B 5/02* (2013.01); *B03B 5/40* (2013.01); *B03B 9/062* (2013.01);
(Continued)

(58) Field of Classification Search
None
See application file for complete search history.

(56) References Cited

U.S. PATENT DOCUMENTS 438,579 A * 10/1890 Faunce ................. C02F 1/4602
204/275.1
4,844,106 A 7/1989 Hunter et al.
(Continued)

FOREIGN PATENT DOCUMENTS

| CN | 201357110 Y | 12/2009 |
|---|---|---|
| DE | 37 17 839 A1 | 12/1987 |
| GB | 563754 | 8/1944 |

OTHER PUBLICATIONS

Translation for DE 3717839 from www.espacenet.com (Year: 1987).*

*Primary Examiner* — Rita P Adhlakha
(74) *Attorney, Agent, or Firm* — Muncy, Geissler, Olds & Lowe, P.C.

(57) ABSTRACT

Apparatus for cleaning contaminated aggregate includes at least one channel arranged in use to receive a liquid containing contaminated aggregate; and first and second banks or groups of at least one jet. The first bank or group of jets is arranged to direct pressurized fluid at the contaminated aggregate in order to agitate the contaminated aggregate against a surface and promote the separation of cleaned aggregate from contaminated aggregate. The second bank or group of jets is arranged to direct and/or urge the cleaned aggregate to a drainage outlet.

40 Claims, 13 Drawing Sheets

(51) Int. Cl.
*B08B 3/04* (2006.01)
*B08B 3/12* (2006.01)
*C03C 23/00* (2006.01)
*C03C 1/00* (2006.01)
*C03C 1/02* (2006.01)
*B03B 9/06* (2006.01)
*B03B 5/40* (2006.01)
*B03B 5/02* (2006.01)

(52) U.S. Cl.
CPC ............... *B08B 3/044* (2013.01); *B08B 3/12* (2013.01); *B08B 3/14* (2013.01); *C03C 1/002* (2013.01); *C03C 1/02* (2013.01); *C03C 23/0075* (2013.01); *B03B 2005/405* (2013.01); *Y02W 30/52* (2015.05); *Y02W 30/60* (2015.05)

(56) References Cited

U.S. PATENT DOCUMENTS

| | | | |
|---|---|---|---|
| 5,387,267 A | 2/1995 | Warf et al. | |
| 7,472,846 B2* | 1/2009 | Thomas | E03C 1/084 |
| | | | 239/391 |
| 8,146,841 B2 | 4/2012 | Andela | |
| 2008/0111089 A1* | 5/2008 | Hasunuma | F16K 1/06 |
| | | | 251/122 |

* cited by examiner

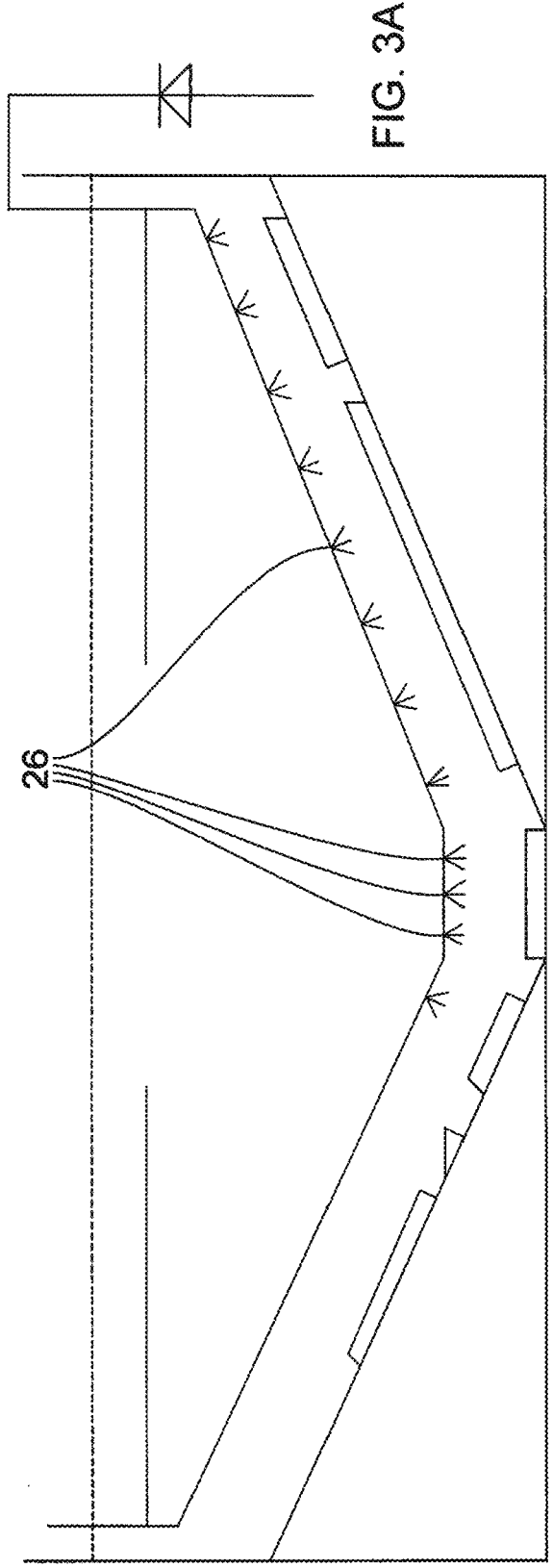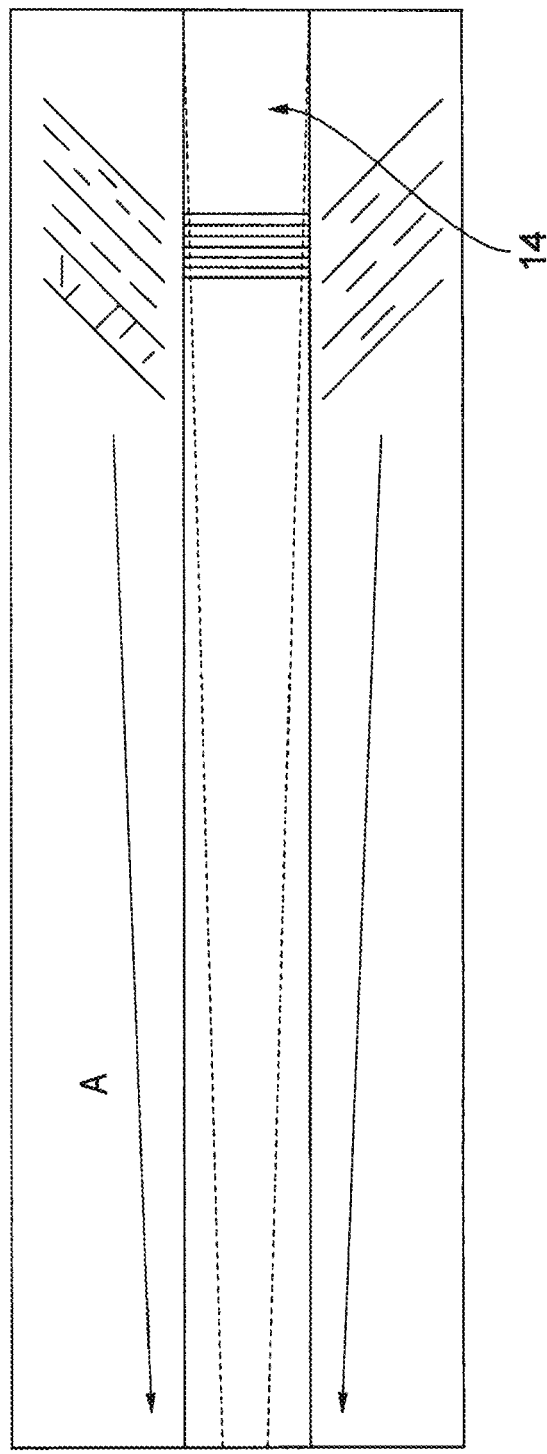

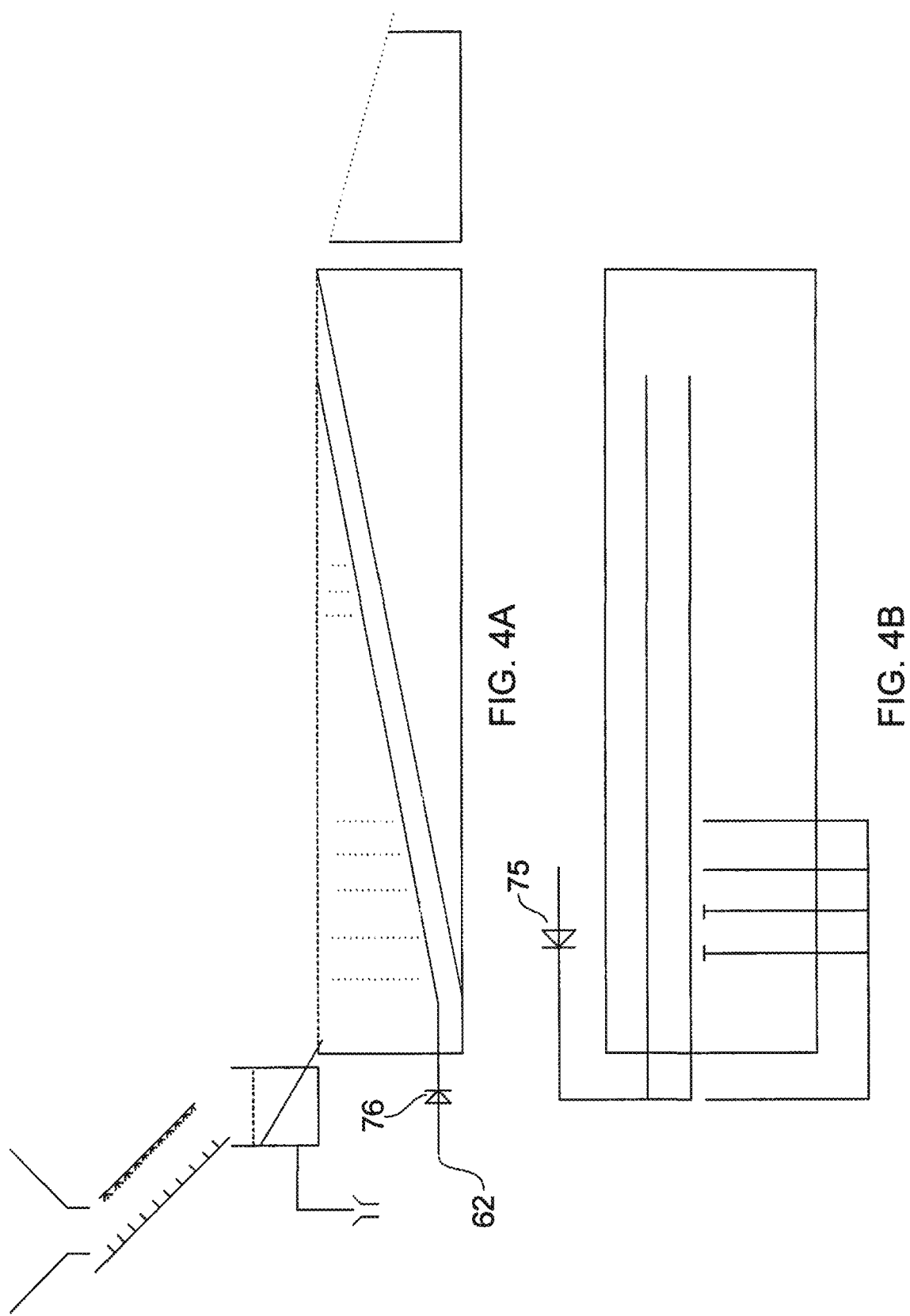

FIG. 10A
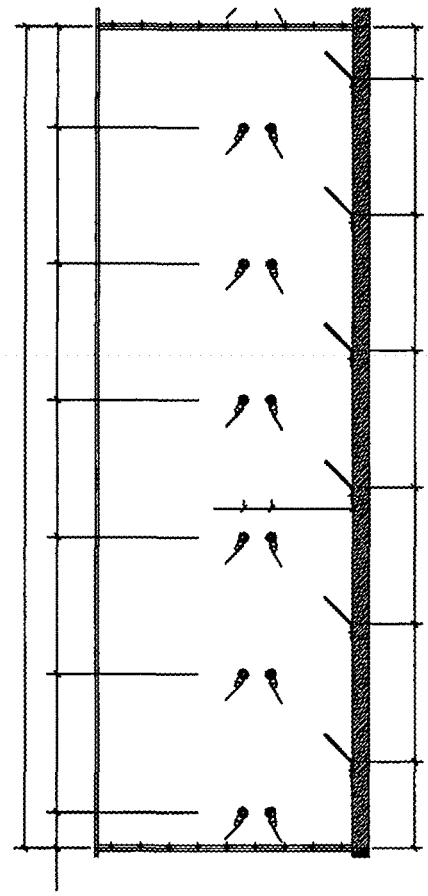
FIG. 10B
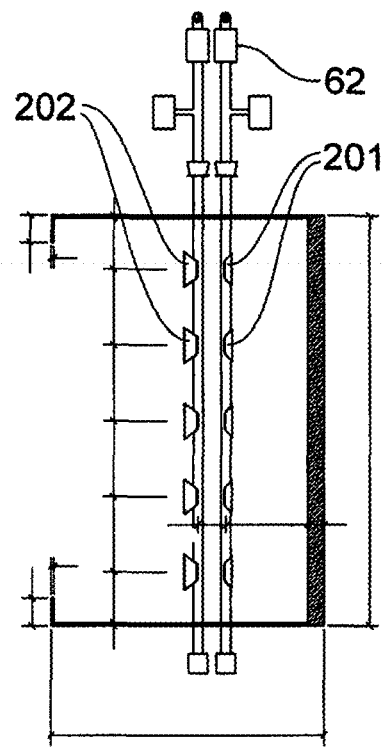
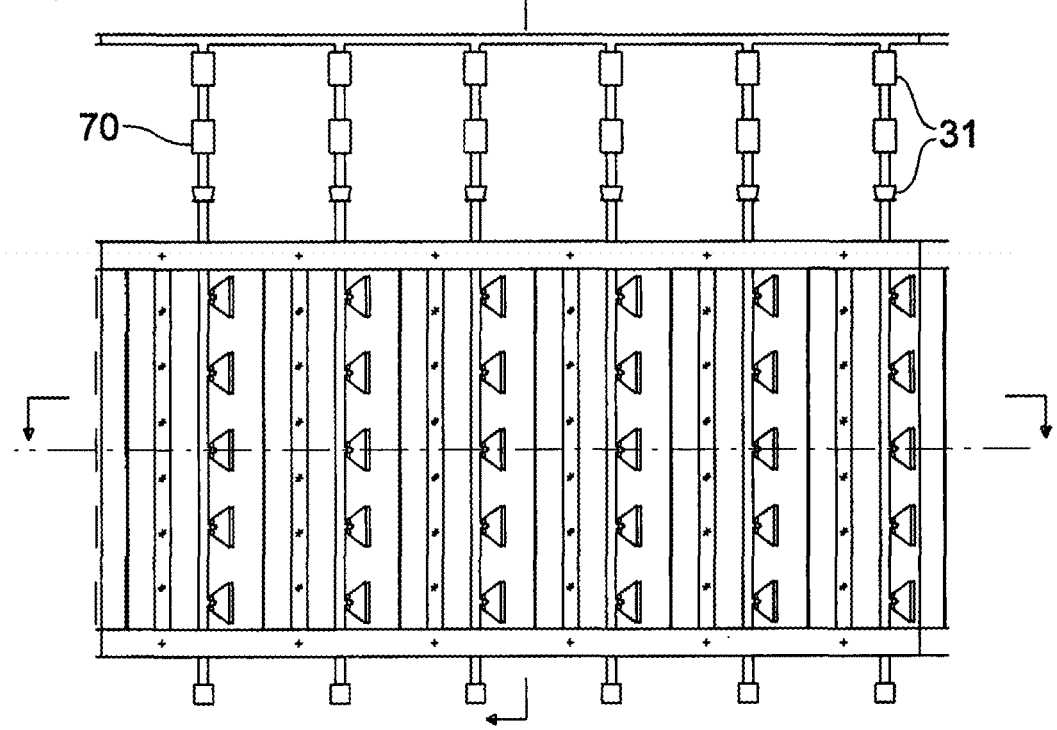
FIG. 10C

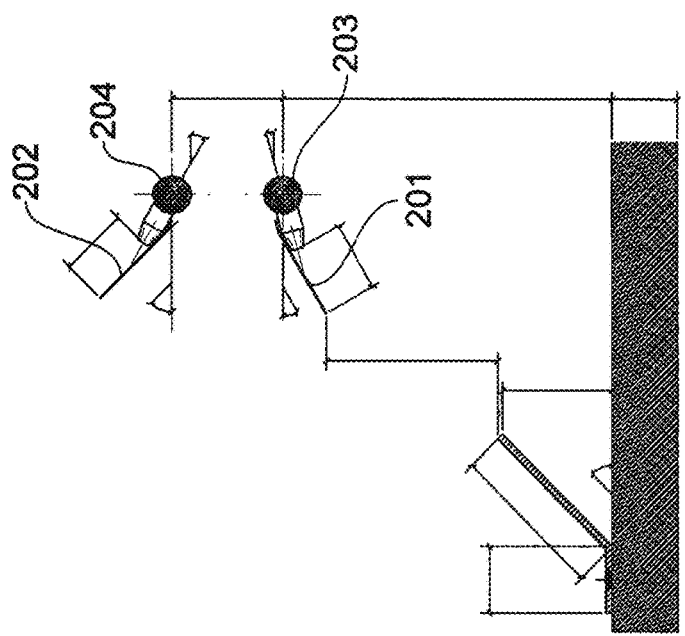
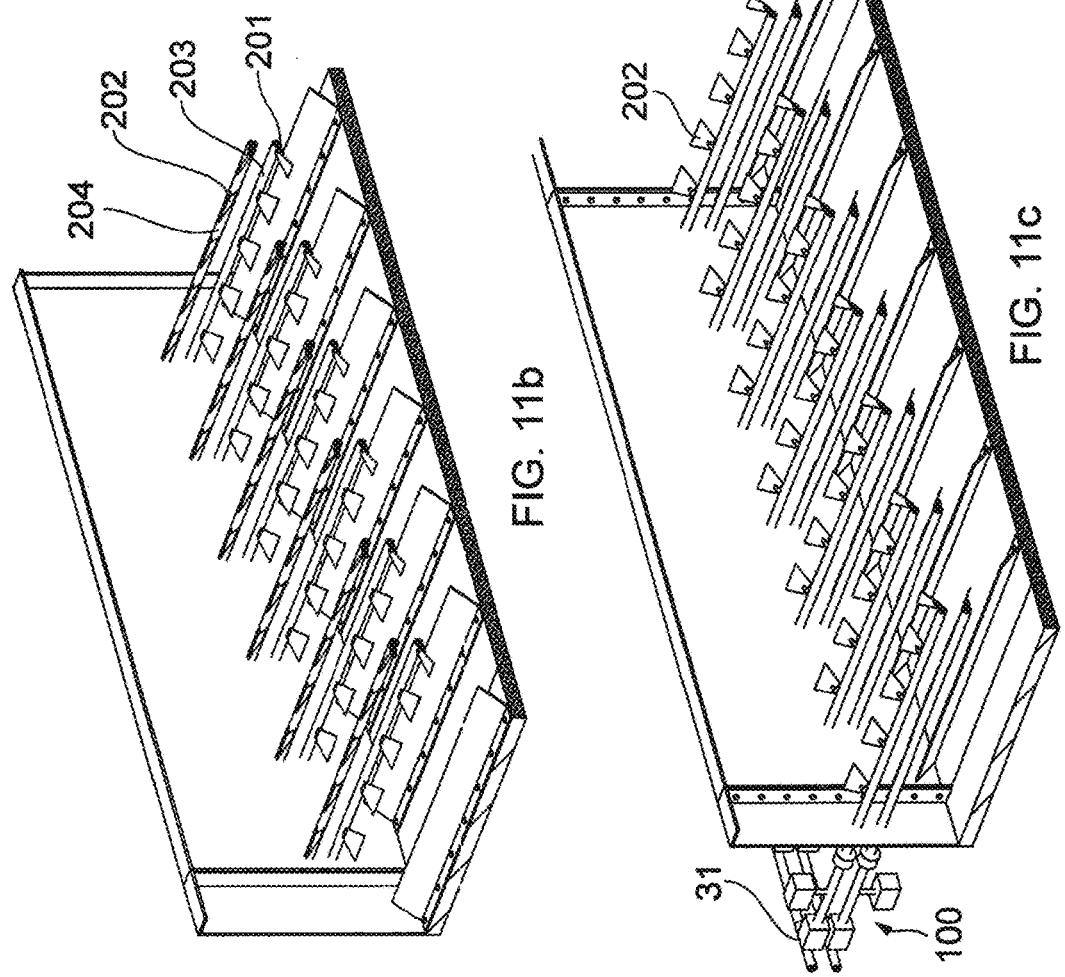
FIG. 11a
FIG. 11b
FIG. 11c

APPARATUS AND METHOD FOR WASHING CONTAMINATED MATERIAL, AND GLASS CULLET PRODUCED THEREBY

FIELD OF THE INVENTION

The present invention relates to an apparatus for washing contaminated aggregate material, such as glass cullet. More particularly, but not exclusively the invention relates to an apparatus for washing glass, particularly broken glass or cullet, and for separating broken glass and cullet from debris and detritus often associated with waste glass and cullet and found in domestic and industrial waste streams.

BACKGROUND

Waste glass is usually collected at recycling centres, by refuse collection companies and from kerbside crates. The majority of the waste glass originates from containers for foodstuffs and beverages and often the waste glass is contaminated with residual foodstuff and other materials, such as packaging, labels, tops and caps which may be plastics, cork and metal.

Collection is typically by way of large containers, sometimes located below ground level and with options to sort glass into different colours. Other forms of collection are at recycling centres or involve householders/consumers depositing bottles and jars in a container, which may be a kerbside collected bin or container.

Alternative collection systems are silos under walkways with shutes or smaller receptacles adapted to be collected by flat-bed trailers or lorries. However, what is common to all these glass collectors is that glass is often broken due to impact and under weight of glass. Consequently fragments of glass become compacted together.

In some situations where remnants of contents of containers are present, such as foodstuffs, agglomeration of compacted glass, biomaterial (such as food remnant), paper and other container parts (such as lids and packaging) forms into a relatively dense, solid block of waste.

PRIOR ART

U.S. Pat. No. 8,146,841 (Glass Processing Solutions LLC) discloses a system for cleaning glass particles produced from post-consumer mixed glass and like waste streams. The system operates by way of a series of pulverizing, size separators and material-based separation.

The system also includes ozonation, drying, sizing, and paper/fluff removal steps. The system described is complex and to a degree relies upon a supply of relatively clean raw materials rather than heavily contaminated waste.

UK Patent Application GB-A-563 754 (Ridley) discloses a system for separating solid granular materials, such as coal or mineral ores. The solids settle on a moving surface disposed beneath floating debris at a depth sufficient for separation to take place. The moving surface raises the solids by an upward inclination of the surface.

German Offenlegungsschrift DE-A-3 717 839 (Andritz) relates to a system for separating light materials, in particular plastics, from pre-sorted refuse fractions. The mixture is subjected to gravity separation in a sink-float basin and the lighter material is removed by floating off these off, so that the mixture is acted upon by liquid jets. A number of jet nozzles are arranged above the sink-float basin so that liquid jets can be sprayed onto the substrate mixtures.

U.S. Pat. No. 4,844,106 (Hunter) relates to an apparatus for cleaning shards of debris for recycling. The apparatus includes a reservoir containing a washing fluid and a moving conveyor partially submerged. A screen has an outlet positioned above the submerged portion of the conveyor so that the shards pass along the screen to the conveyor while some debris and contaminant material falls through the screen and into the reservoir away from the conveyor. Shards are washed and conveyed past a bank of spray nozzles which spray the shards in a direction against the motion of the conveyor.

Published Chinese Patent Application 2013-A-2013/57110 (China Bluestar) relates to a device for separating mercury from glass fragments in waste fluorescent tube fragments. A spiral conveyor consists of a shell body and a built-in rotating spiral body. The front lower part of the shell body houses a conveyor forming a feed inlet. A mercury discharge opening receives mercury fumes and a spray device is arranged on the front face of a middle region of the shell body.

Whilst to some degree the aforementioned systems have proved effective at their specific intended tasks, there is not any system that is able to remove packaging and labelling from waste glass, such as jars and bottles.

Increasingly there is a demand for clean waste glass as a raw material for many types of specialised end uses, such as producing glass fibre for fireboards or insulating materials.

The present invention arose in order to provide a separator for waste glass specifically adapted to remove residual foodstuff, packaging and contaminating materials from the waste glass.

Another object of the present invention is to provide a method of washing glass in order to provide a clean cullet material for processing and other product streams.

A yet further aim of the invention is to provide a method of washing and separating debris and waste material from contaminated aggregate, such as, for example glass cullet.

SUMMARY OF THE INVENTION

According to a first aspect of the present invention there is provided an apparatus for cleaning contaminated aggregate comprising: at least one channel arranged in use to receive a liquid containing contaminated aggregate; and first and second banks or groups of at least one jet; in which the first bank or group of jet(s)s is arranged to direct pressurised fluid at the contaminated aggregate in order to agitate the contaminated aggregate against a surface thereby promoting separation of aggregate from debris; and in which the second bank or group of jet(s) is arranged to direct and/or urge cleaned aggregate to a first outlet for removal of the aggregate whilst directing debris to a second outlet.

The aggregate may for example be glass cullet. The pressurised fluid may be for example liquid or gas. The pressurised fluid is preferably liquid, for example water.

Ideally the jets are arranged in groups and are switched in groups and/or in a cyclic manner so as to provide the dual effect of agitating and pummeling the waste glass in order to clean it. This repeated action removes labels and detritus from the glass with sufficient force as to promote a forward momentum to the broken glass and cullet so that pieces move from one region of the channel to an adjacent region. This pulsing effect ensures that cullet precesses along the channel, each time being further cleaned and washed due to the combined agitation, washing and abrasion of pieces of glass against one another and the channel walls.

According to a further aspect of the present invention there is provided an apparatus for washing contaminated aggregate comprising: at least one channel arranged in use to receive a liquid containing contaminated aggregate; and at least one jet for directing pressurised fluid at the contaminated aggregate in order to agitate the contaminated aggregate thereby promoting separation of aggregate from contaminate and urging the aggregate through the channel(s); and a means for removing contaminate from the surface of the liquid, wherein baffles are provided in the channel.

According to another aspect of the present invention, there is provided a method of washing a contaminated aggregate comprising the steps of introducing contaminated aggregate into a channel containing a liquid, urging the aggregate through the channel, agitating the aggregate using jets of fluid and removing contaminate from the surface of the liquid.

According to a yet further aspect of the present invention there is provided a method of washing a contaminated aggregate comprising: introducing contaminated aggregate into at least one channel of the apparatus as herein described containing the liquid; urging the aggregate through the at least one channel; agitating the aggregate using jets of fluid; and removing contaminate from the surface of the liquid.

Ideally the channel(s) is defined by a rectangular cross sectional trough or tank. However, other shaped troughs may be used such as for example those with triangular or square cross sections. Also cross sections may vary longitudinally, for example, they may taper.

The apparatus may comprise a plurality of channels. Ideally channel(s) are provided in a trough at or adjacent a lower region or on the bottom of a trough.

The channel(s) may extend along substantially the entire length of the trough.

The apparatus may comprise a plurality of channels extending substantially parallel to each other within a trough.

An object of the channel(s) is to direct fluid jets, for example water jets, towards a region where contaminated aggregate, such as for example contaminated glass cullet, tends to accumulate. Aggregate tends to accumulate towards the lower region or bottom of the channel(s) and/or trough. The directing or focusing of fluid jets (or a strong current of water) in this way, towards the lower region or bottom of the channel(s) and/or trough, also has the beneficial effect that a steady transient current is promoted that runs from one (entrance) end of the channel and/or trough to an opposite (exit) end of the channel and/or trough so as to promote a through flow of aggregate, such as for example glass cullet, from the entrance end of the channel and/or trough.

The aggregate, such as for example cullet, entering the apparatus at the entrance end of the channel and/or trough is contaminated. The aggregate, such as for example cullet, exiting the apparatus at the exit of the channel and/or trough has a reduced amount of contamination compared to the aggregate entering the apparatus at the entrance end of the channel and/or trough.

The height and width of channel(s) is selected according to throughput and nature of the contaminated aggregate, such as for example contaminated glass cullet. Also the channel(s) are preferably adjustable. For example, the dimensions of the channel(s), for example the height and/or width of the channel(s) may be adjustable. The angle of the channel(s) with respect to the horizontal may also be adjustable. The angle of the channel(s) walls with respect to the base of the channel(s) and/or trough may also be adjustable. The channel(s) may also be removable from the trough.

The apparatus may further comprise one or more weirs and/or dams. For example, the trough may comprise one or more weirs or dams, or combinations thereof. The weirs and/or dams may be positioned, for example within the channel(s) of the trough, in order to control flow of liquid and/or washed aggregate, such as for example cullet, through the apparatus, for example through the trough.

There may be a plurality of channel(s) extending substantially the entire length of the trough. Ideally fluid jets, such as for example water jets, are located so as to be positioned in order to create a separate water/liquid current. For example, one or more banks or groups of jets may be located above the surface of the water/liquid within the channel(s) in use.

Preferably the entrance to and/or exit from a channel(s) is shaped, for example sloped and/or smooth, in order to promote the passage of aggregate, such as for example broken glass and cullet through the channel and prevent blockage at a channel end.

Preferably the trough is deployed in a horizontal condition. However, the trough may be raised at one end at an angle to the horizontal. At least one bank or group of jet(s) of fluid/water may be arranged to be directed at an angle to the main direction of flow of liquid or water through the trough. The trough can also be horizontal in order to create a large spread of debris and glass.

The apparatus may comprise a plurality of troughs. The troughs may be arranged so that the aggregate, for example cullet, cleaned by a first trough is fed into another subsequent trough. This arrangement enables part cleaned aggregate, for example part cleaned cullet to be cleaned further by one or more subsequent trough(s). Each subsequent trough provides further cleaning of the aggregate.

The apparatus may comprise at least one bank or group of jets located adjacent or above the surface of the liquid in use. For example, the first bank or group of jets may be located adjacent or above the surface of the liquid in use.

The apparatus may comprise at least one bank or group of jets arranged to be directed at an angle to the main direction of flow of the liquid through the channel(s). For example, the second bank or group of jets may be arranged to be directed at an angle to the main direction of flow of the liquid.

The apparatus may comprise at least one bank or group of jets located below the surface of the liquid in use. The at least one bank or group of jets may for example be located below the surface of the liquid within the lower region or adjacent the bottom of the channel(s). For example, the second bank or group of jets may be located below the surface of the liquid in use. The second bank or group of jets may be located below the surface of the liquid within the lower region or adjacent the bottom of the channel(s).

The first bank or group of jets may be arranged to direct pressurised fluid in a generally downward direction so as to agitate the contaminated aggregate. The second bank or group of jets may be arranged to direct pressurised fluid in a generally upward direction so as to promoting a current through the channel(s).

The jets of the at least one bank or group of jets are of any suitable shape, for example the jets may be fan shaped.

The first and second banks or groups of jets may be arranged in any suitable formation. For example, the first bank or group of jets may be arranged within a first array comprising a plurality of rows of first jets. The second bank or group of jets may be arranged within a second array comprising a plurality of rows of second jets. The first bank or group of jets may be arranged to be offset from the second bank or group of jets. For example, the first array of jets may be arranged to be offset from the second array of jets.

Preferably, each row of first jets of the first array may be offset from each corresponding row of second jets of the second array. The jets may be offset from each other in any suitable direction, for example in a vertical direction. The jets may be offset in a direction extending substantially parallel to the direction of liquid flow within the channel and/or trough. For example, each row of the first array may be offset vertically from the corresponding row of the second array.

Each row of the first array may be offset from the corresponding row of the second array in a direction extending substantially parallel to the flow of liquid through the channel and/or trough.

The apparatus for washing contaminated aggregate, for example glass cullet, may further include one or more deflectors. The deflector(s) may be arranged in use to be located above the surface of the liquid containing the aggregate, within for example the trough(s) and/or channel(s). The deflector(s) may be arranged in use to assist with removal of contaminate that floats on the surface of the liquid.

The deflector(s) and or barriers may be arranged to be located above, or to float on or just below the surface water level of the aggregate in order to aid the removal of debris and detritus that has been removed from the aggregate. The deflector(s) may assist to confine the debris, allowing it to be removed using air jet(s) and/or water jet(s) and/or fine spray(s) and/or vents, in order to direct debris that is on the surface of the water to a waste or gutter.

Ideally the means for removing contaminate from the surface of the liquid includes a fan and/or blower. The apparatus may further comprise barriers and/or guides which are provided in order to divert debris on the surface of the trough to a waste drain.

A further jet of water, fine spray or an air current, or any combination thereof, can be used to help move and/or separate the debris to a waste or drain. This jet, fine spray and/or current may be either confined to a region close to or above the surface of the liquid, such as for example water, or just below the surface of the liquid, in order to help create a diverting current. The size and position of the diverting current may be varied depending upon the nature of the debris being removed, the amount of debris and its weight.

Furthermore variation in the magnitude and direction of the current can be achieved by providing different fluid jets, for example water jets, and/or pressures. One way this can be achieved is by way of needle valves and/or isolating valves in order to ensure a rapid change of flow through the trough.

Advantageously the trough may comprise at least one channel that is generally U-shaped or V-shaped in cross section. The channel(s) can also be flat or an 'A' shape in order to allow glass and heavy matter to separate and lighter debris to rise to the surface. This separation may be enhanced by way of separation members, such as for example filters, nets, brushes or meshes, or any combination thereof, which may be located close to the surface or drawn across the surface (or just below) the surface of the water.

One way of operating the separation members, such as for example filters, nets, brushes and/or meshes is to mount them on one or more movable arms and/or booms. The moveable arm(s) and/or boom(s) are preferably arranged to be moveable, for example continuously moveable, across the liquid surface, such as for example the water surface. The arm(s) and/or boom(s) may for example be connected to a rotating actuator which continuously moves the arm(s) and/or boom(s) with respect to the surface of the liquid, such as for example water.

The apparatus may further comprise one or more baffles. The one or more baffles may be provided in the trough and/or channel. An advantage of these baffles is that they control and direct current and direct debris floating on the surface of the liquid containing the aggregate, such as for example water, in a particular direction. These baffles ensure that the debris is separated and is prevented from returning below the water and contaminating already cleaned aggregate, such as for example cleaned glass cullet.

Preferably the baffles are adapted to be set at different angles and optionally this may be performed automatically using actuators. An advantage with variable angle baffles is that they can be altered to accommodate different strength currents and different conditions of contaminate and debris. They can also be arranged to direct waste streams of floating debris towards the filters, nets, brushes or meshes.

Optionally the channel is deployed at an angle, for example at an angle to the horizontal, so as to promote movement of the aggregate, for example glass cullet, through the channel in a desired direction: such as for example towards the exit of the trough or channel.

Channels may for example be installed to the trough as a retrofit item and may be formed at any desired angle with respect to the flow of current through the trough so as to ensure maximum agitation of the aggregate, such as for example glass or materials. The angle of impact of the water jet(s) on the liquid stream containing the aggregate is ideally set so as to direct the water to the aggregate, for example cullet, at an angle that aggressively agitates the aggregate, for example cullet. This agitation and angle of incline of channel(s) preferably optimises the amount of abrasive action that takes between the aggregate and the channel(s) which as a result helps to clean the aggregate, whilst directing clean aggregate towards the exit of the trough and without slowing the rate of procession of the material through the trough.

Movement of aggregate or cullet through the trough may be improved by agitating or shaking the trough and/or tank. This may be achieved in a number of different ways. For example, a base section and/or the channels and/or or the whole trough may be adapted to shake on rubber feet or on an oscillating cam, which promotes uttering of aggregate, for example cullet, and so improves washing of aggregate and separation of debris in the liquid by virtue of the side-to-side gyration or up-and-down tamping action that is achieved.

One or more means is advantageously provided for varying the flow rate of fluid, for example liquid, through a jet. Ideally this is done using a combination of needle valves, pressure reducing valves, isolating valves or by regulating flow through the jet/nozzles, or a combination thereof.

By optimising this balance, the ideal flow rate of liquid through the trough (for example the desired litres of liquid per minute) is achieved in order to allow the aggregate, for example glass, sufficient time to be agitated against the walls/base of the trough and against itself, whilst at the same time ensuring that a sufficient mass flow of aggregate, for example glass, moves along the channels; through the trough and towards the exit. If the flow rate is too high, a through flow of aggregate prevents efficient separation of debris from the aggregate. If the flow rate is too low, the through flow, for example the transit of aggregate, is inefficient and may result in blockages. As a result, if the flow rate is too low the overall operating capacity of a trough is reduced and can result in 'churning' of the aggregate so that clean aggregate never actually exits from the trough.

The apparatus may further comprise one or more aeration systems. Aeration system(s) may help lift less dense waste and particles of debris from the bottom of the trough and/or to assist lighter debris to float to the surface. The apparatus may be arranged such that the aeration system(s) is operable intermittently and/or restricted to use in one or more particular regions of the trough where heavy or coagulated debris accumulates.

Optional use of the aeration system in an intermittent manner and/or in one or more particular regions may help to prevent the formation of cullet build up or blockages, to prevent the 'churning' of aggregate and/or lift the aggregate from lower regions of the trough.

Furthermore the aeration system(s) may be configured so that the water jet(s) interact with rising air currents so as to further agitate aggregate and particles by creating tumbling currents. The use of aeration systems may also help to reduce wear on lower surfaces of the trough and/or promote eddy currents so as to improve localised abrasion between pieces of cullet.

The orientation of the jets is preferably variable with respect to the channel. This may be achieved manually or automatically. For example, the relative height of one or more of the jet(s) from the base may be variable so that the distance from a particular jet to the bottom of a channel(s) is adjustable. Further variation can be achieved by using more or less jets to create stronger or weaker currents. It is understood that jets may be added or removed depending upon the size and of nature the cleaning trough or its location, or the material that is being cleaned or processed.

The apparatus may further comprise one or more vibrating tray located up stream of the, or at least one, trough. The tray(s) ideally vibrates aggregate, such as for example coagulated glass pieces or cullet, before it enters the main trough. The vibrating tray(s) may further comprise impact bars and/or water jets in order to enhance the initially break up of large compacted masses of material thereby assist in separating and softening the unwashed waste broken aggregate, such as for example glass cullet.

Jets of fluid, for example water, are ideally adapted to impact the aggregate, for example glass pieces or cullet, in order to loosen waste material from their surface and dislodge any contaminating matter such as food or other debris. Jets are ideally adapted to create self-agitation of the aggregate so as to promote abrading or rubbing/grinding of aggregate particles, thereby loosening debris which is swept away by the water current.

Optionally the jets are able to move in accordance with one or more of a servo or motor or water powered device(s) for altering their flow pattern and/or direction of waterjetting. The servo and/or motor and/or water powered device(s) can be pre-programmed, to allow a user or operator to alter and select the desired pattern for the jets and agitators.

Ideally a metal recovery system is provided. The metal recovery system optionally includes an electro-magnet.

The main water/air pipework feeding the apparatus may also have a servo-assisted motor that capable of remotely shutting down the water and/or air supplies in the event of a failure or fault. Such remote activation may be remotely activated via a radio frequency signal or via the Internet, short message service (SMS) or via a satellite monitoring.

Preferred embodiments of the invention will now be described by way of example only and with reference to the following Figures, in which:

BRIEF DESCRIPTION OF THE DRAWINGS

FIGS. 3a and 3b show sectional and plan views respectively of examples of a tank or trough for cleaning contaminated glass;

FIG. 4a is a side elevation view of a tank or trough for cleaning contaminated glass using an aeration system;

FIG. 4b is a plan view of an example of a layout of pipework to supply air to the tank or trough shown in FIG. 4a;

FIGS. 10a to c show cross-sectional and plan views of an embodiment of a glass cleaning apparatus comprising a first band or group of jets and a second band or group of jets;

FIGS. 11a to 11c illustrate perspective and cross-sectional views of an embodiment of the apparatus comprising a first band or group of jets and a second band or groups or jets;

DETAILED DESCRIPTION OF PREFERRED EMBODIMENTS OF THE INVENTION

Figure 1:
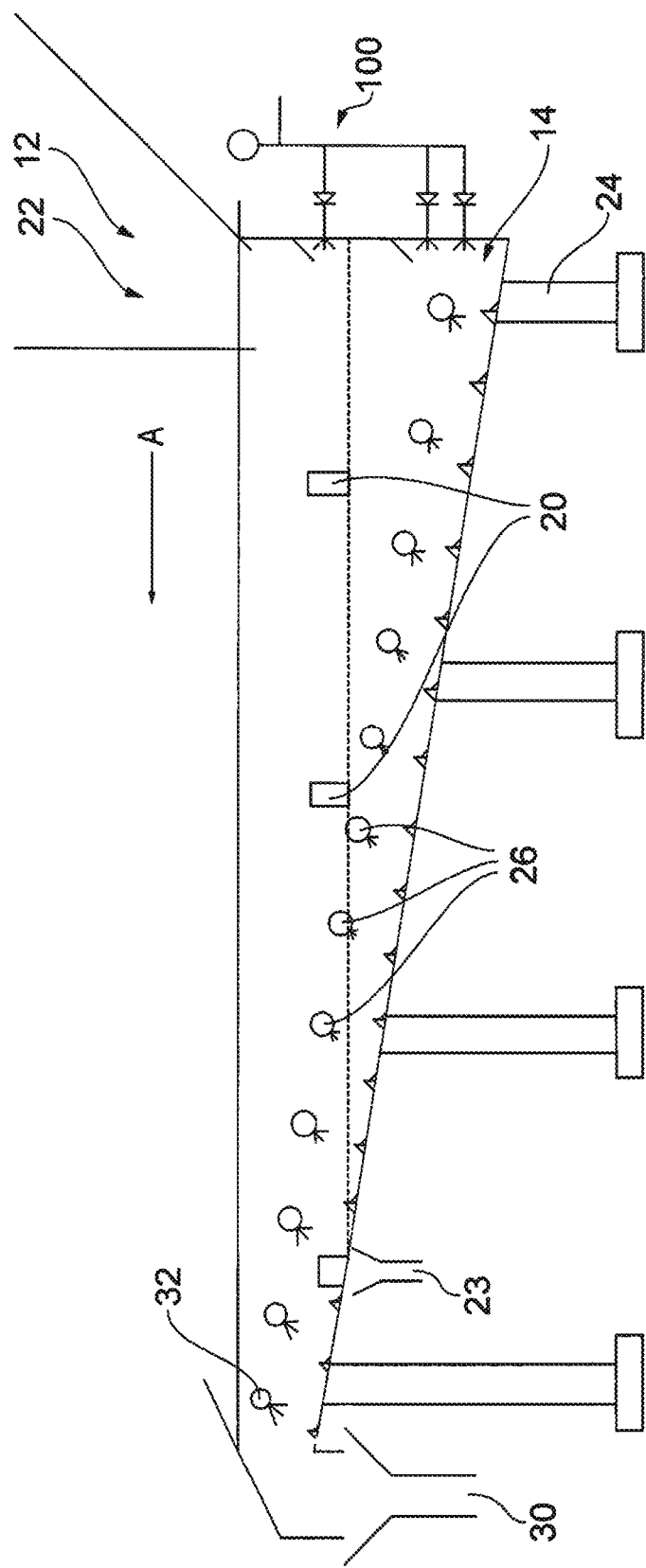
FIG. 1 shows an overall diagrammatical side elevation view of one embodiment of a glass cleaning apparatus in the form of a tank or trough on legs and through which glass passes and is washed.

Referring to the Figures, there is shown in FIG. 1 one example of an apparatus 10 for washing contaminated glass cullet or broken pieces of glass or cullet 12 comprising: a generally rectangular channel 14 which, in use, contains water 16 and a pump 36 means for urging the glass cullet 12 along the channel or trough 14 in the direction of arrow A.

Baffles or barriers 20 are provided at intervals and are dimensioned and arranged to agitate glass cullet 12 and to deflect debris 22, ensuring debris 22 and glass cullet 12 are separated one from another. Less dense debris 22—such as plastics, food debris and paper, floats across the surface of the water 16 and is drained from the apparatus 10 via drain 23.

The baffles 20 can be arranged at different angles either manually or by automatically using actuators (not shown). An advantage with variable angle baffles 20 is that they can be altered to accommodate different strength currents and can be set or varied in order to prevent build-up of cullet 12 so promoting movement through the trough.

The trough 14 can be located on the ground or it may have legs 24 or it can be supported on a vibrating jigger (not shown) or other movable support (not shown). As debris 22 is delivered to one end of the trough 14, water jets 26 impact the cullet 12 and debris 22, agitating cullet 12 and loosening debris 22 thereby forcing debris 22 to the surface so that it is swept or floats towards the drain 23.

Each jet 26 forces debris 22 over agitators 28 and this creates a violent and forceful rubbing action between cullet 12. This helps to remove and displace the debris 22 from the glass 12 so that it can be expelled from the apparatus. As debris 22 floats to the surface, it is forced via jets 32 to be removed via gutters or drains 23. As cleaned glass cullet 12 progresses towards the exit 30, a final spray/flush is provided by rinsing sprays 32. Cleaned cullet 12 is then allowed to exit the trough 14. Ideally water 16 is recycled and re-enters the trough 14 after filtering and disinfecting.

Water 16 may be heated, for example by using waste heat from a suitable cooling system such as a power station cooling tower (not shown) or from a bespoke water heating plant (not shown). Optionally a water treatment chemical is added to the water, such as a surfactant, in order to dissolve grease and/or a disinfectant in order to kill bacteria and reduce the risk of water/droplet borne diseases from being spread.

Located in the channel 14 are underwater jets or nozzles 26 for directing pressurised water at the aggregate or cullet 12 in order to agitate the cullet or aggregate thereby promoting separation of glass cullet from contaminate/debris 22 and a means for removing contaminate/debris 22 from the surface of the liquid 16.

The more energetic the underwater jets 26 of water impact against the glass cullet 12, the more debris 22 is removed. Therefore the angle of the underwater jets 26 is arranged so as to allow both agitation of the cullet 12 and to allow flow of the glass 12 to progress through the trough 14 to the exit 23. If underwater jets or nozzles 26 are positioned at too steep an angle performance and efficiency of cleaning may be impaired. It is therefore important that the optimum angle of underwater jets 26 is preserved.

Referring to FIG. 10*a*-11*c*, control means 100 is provided to control both underwater jets 201 and 202 which force water in the general direction of arrow A. The control means 100 changes the duration jets 201 and 202, the pressure (mass flow of water) the jets 201 and 202 deliver, the angle of the jets 201 and 202; the overall volume; and direction of net flow of the water 16 in direction of arrow A. By optimising the choice of these variables a slight over pressuring is achieved and so a net force drives or sweeps the denser glass cullet or broken glass pieces 12 over agitator/s 28 along the bottom of the water trough 14.

Figure 7:
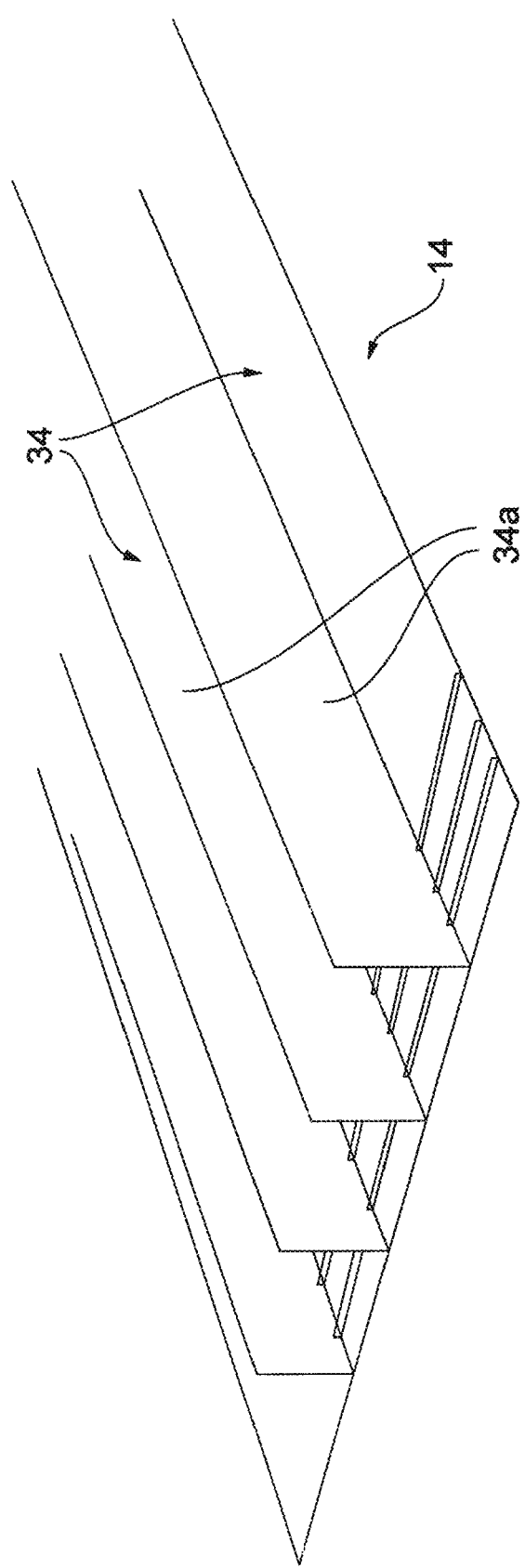
FIG. 7 is an overall diagrammatical view of a plurality of blades that define a channel for deployment in a trough.
Figure 8:
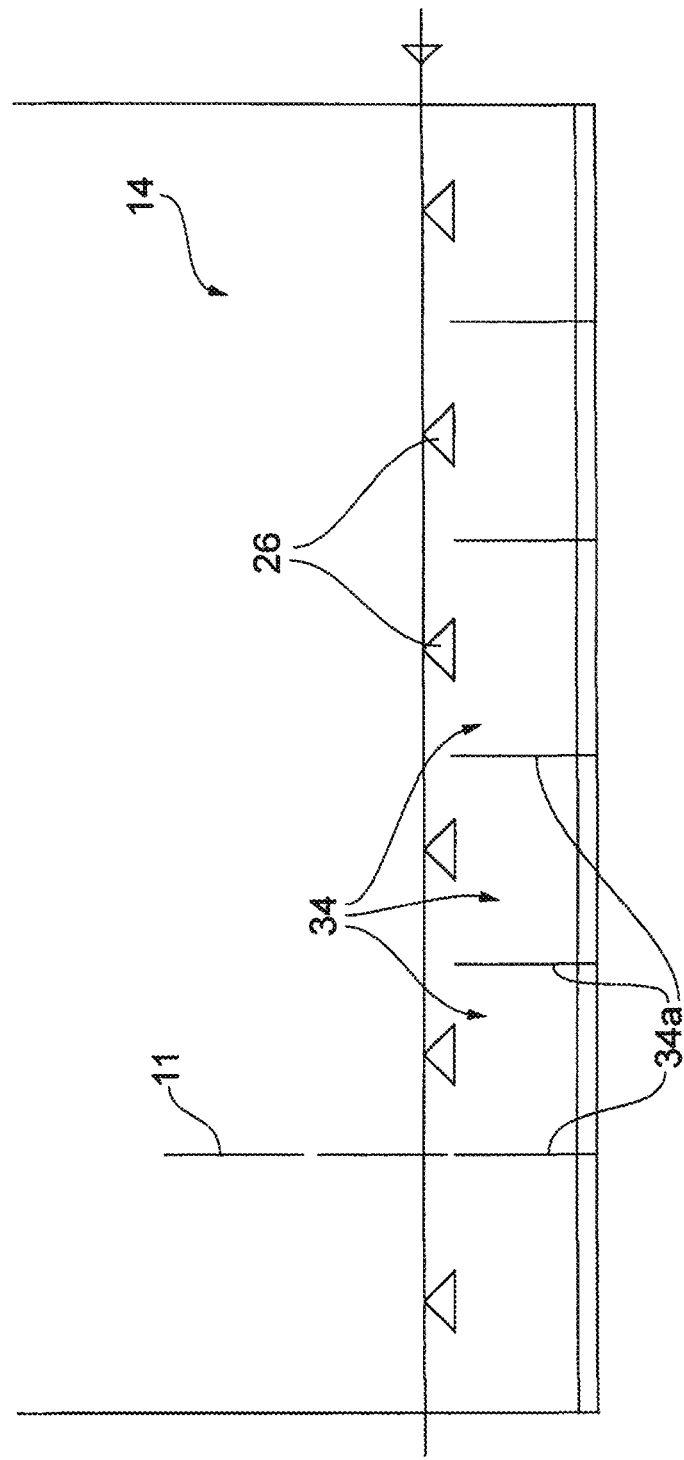
FIG. 8 is an overall diagrammatical end view of the blades shown in FIG. 7.

Referring briefly to FIGS. 7 and 8, vertical channels 34 are approximately 150 mm deep. Sections of channel 34 can be added to increase the overall depth of channels. Channels direct the flow of water and allow the glass cullet 12 to move towards the exit 23. Optionally channels 34 may comprise 'V' shaped (FIGS. 3*a* and 3*b*) or corrugated trenches (not shown) so as to channel glass cullet 12 more efficiently. Also such 'V' shaped or corrugated trenches are easier to clean and clear in the event of a blockage.

Agitators 28 provided along the base of a channel 34 or trough promote agitation and abrasion of glass pieces. Location, shape and size of agitators 28 are selected so that jets 26 direct pieces of glass 12 against agitators 28 so that the broken pieces 12 collide with one another and agitate or abrade one another, enhancing the removal of debris 22, such as paper and unwanted waste material.

The agitators 28 can be adjusted to improve abrasion depending for example on the nature of materials being cleaned. Agitators 28 can also be removed and replaced if needed. They may be arranged in a parallel configuration, extending lengthwise along or transversely across a trough 14.

Figure 9:
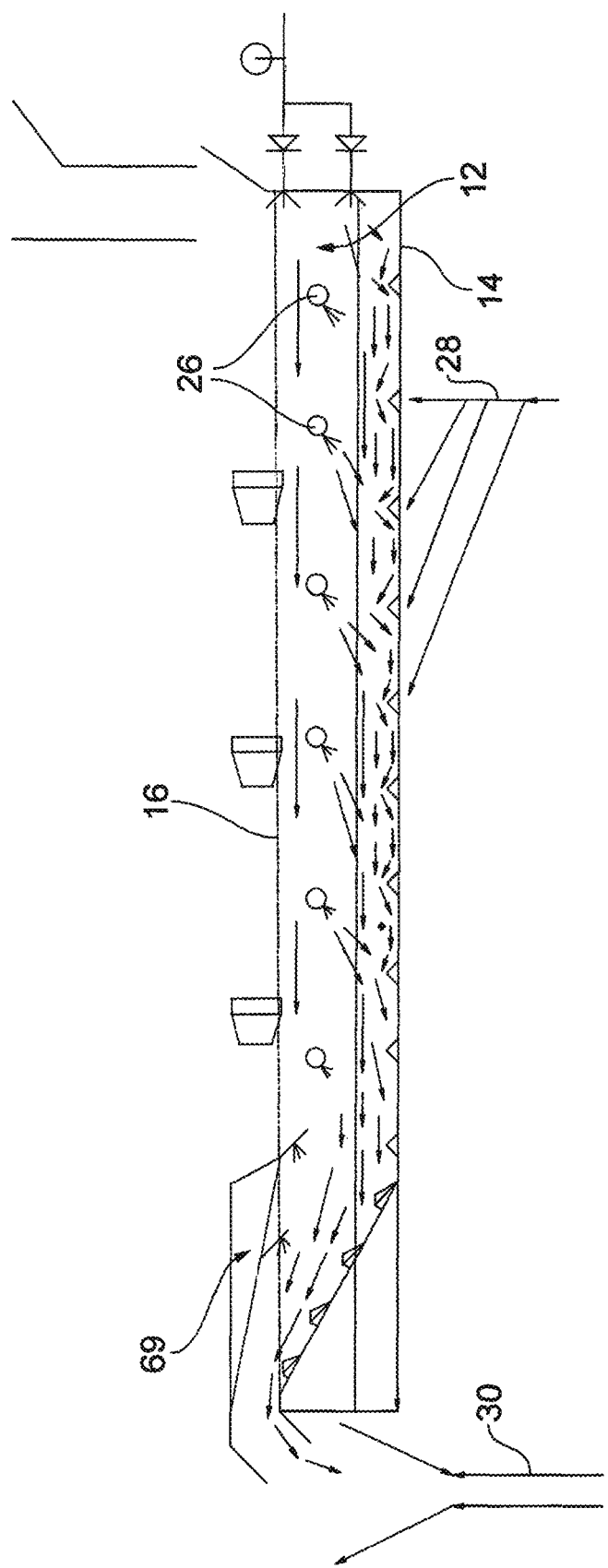
FIG. 9 is an overall diagrammatical side elevation view of a plurality of an alternative embodiment of a glass cleaning apparatus in the form of a tank or trough showing agitators.

Referring to the remaining Figures, in which like parts bear the same reference numerals, in FIG. 9 an alternative embodiment is shown in which the base of the trough is horizontal, whereas in other embodiments the base of the trough 14 is inclined at an angle of typically between 5° and 25°. A higher angle of inclination promotes a more rapid transit of cullet 12 as the water current urges glass and waste material towards the exit 23 of the trough more quickly in an inclined trough 14. The inclination angle can be adjusted and varied over the length of the trough 14 in order to increase/decrease mass of glass cullet flowing through the trough 14.

Figure 2:
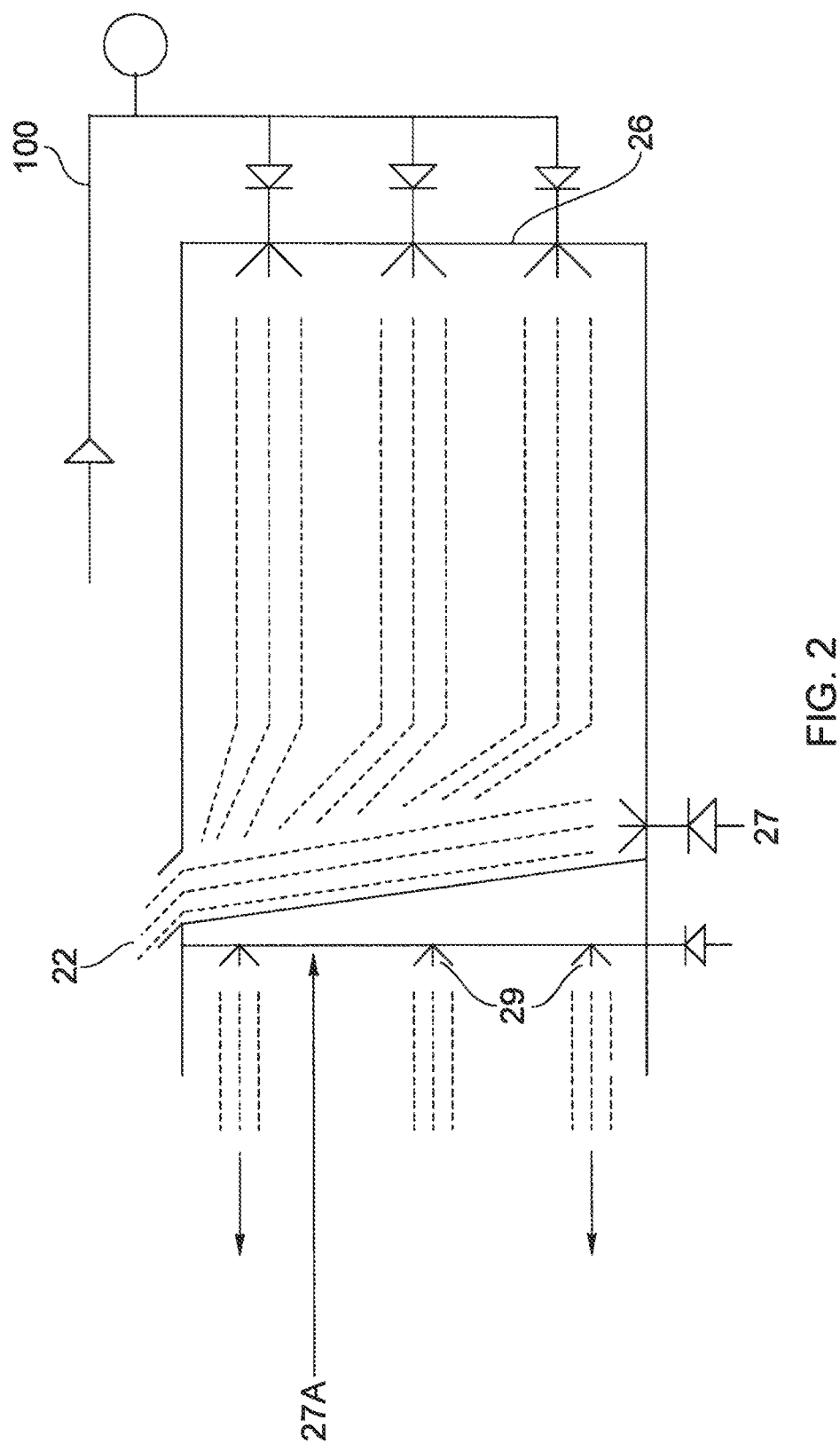
FIG. 2 shows an overall diagrammatical plan view of debris collections system, for use with a tank or trough, and depicts location and orientation of spray heads for sweeping debris in to a drain.

In FIG. 2 the means for removing debris 22 from the surface of the liquid 16 includes a water sprays or jets 26 arranged on supports 27*a* and suspended over the surface of the water 16. As an alternative to water, air currents are forced through nozzles 29 and these help to 'sweep' lighter debris 22 towards the drain 23 by establishing an air current across the surface of the water. The nozzles 29 can be altered/moved and pressures in them varied by way of needle valves 31 according to the nature of the debris being removed.

Net flow in a desired direction is ideally promoted by way of arranging a gradient in the trough 14 to promote liquid flow or net current of liquid. The water jets 26, in conjunction with an external pump 36 are adapted to achieve this operating under control of controller 100.

Referring to FIGS. 7 and 8, vertical channels 34 are also used to guide and control the water currents. Channels 34 help to maintain a constant flow and an even current and reduce energy needs as the channels 34 assist in separating a below surface water current, which as mentioned above may be quite vigorous, from a relatively smaller surface or stagnant surface current, promoted by fine sprays 29 or air currents which sweep the floating debris 22.

It is apparent that a balance is struck and maintained between below level water flows and agitators 28 which promotes a high degree of local turbulence and the relatively tranquil conditions of the surface of the water 16 in the trough. The surface current being sufficient to transport debris and less dense materials to the drain, whilst the subsurface current being locally very vigorous to promote abrasion and cleaning of the glass cullet 12. The agitators 28 can be installed at a variety of angles.

Means may be provided to an operator to adjust the desired rake of the agitator(s) 28 or the agitators may be rigid and fixed to the base portion of a trough 14. Thus it is appreciated that the agitators when passed over one after another present a 'washboard' surface that helps speed up cleaning or retain cullet 12 and broken material in the trough 14 for a longer time period.

An exit shute 30 is ideally in the form of a low level exit gate, that is adjustable in height and is provided for the removal of washed cullet 12 at the base of the trough 14. The exit shute can also be in the form of an overflow. This shute 30 is separate from the drain 23 through which debris 22 passes.

The exit drain 23 allows the debris 22, to exit the trough 14 from the surface of the water 16, by flowing over the top edge of the trough 14, running the length of the trough 14. This allows the debris 22, to be forced up and out into drain 23, using the force of the water from jets 26 and 32.

The control means 100 is adapted to control one or more needle valves 31 associated with water jets 201 and 202 in order to create a balanced current which has an overall drift effect as mentioned above. Adjusting needle valves and/or isolating valves 31 allows an operator to obtain optimum flow rate of water and control is further improved by way of elongate members, such as manifolds 203 and 204 that are optionally provided and can either be shut down or bypassed in order to alter flow patterns. Other regulating valves or isolating gate valves may be used. The elongate members, such as manifolds 203 and 204, jets 201 and 202 and control system 100 are so adapted as to enable extra elongate members, such as manifolds 203 and 204 and jets 201 and 202 to be added.

Angle of deployment of jets, relative to the surface of the water 16, as well as the amount of water they are arranged to deliver are varied according to demand and intensity of the water that is needed to impact broken glass. This may be achieved in a progressive way through the trough 14: for example at entry of the cullet 12 into the trough, jets may be configured to apply a large impact force and this force decreases as cullet 12 processes along the trough 14 towards the exit shute 30. Alternatively intensity of water applied via the underwater jets 201 and 202 might alternate in force from one region of the trough to another in the direction of travel and as glass cullet 12 passes through the trough 14.

Referring now to the remaining FIGS. 3a and 3b show sectional and plan views respectively of examples of a tank or trough 14 which may either have a V-shaped base region or be flat and so define a relative U-shaped trough profile. The trough 14 is a 'V'-shaped profile and this ensures the glass/aggregate concentrates at the bottom of the trough 14. This profiling also encourages the glass cullet 12 to abrade against itself.

Agitators 28 are shown installed at different angles and different heights according to a number of factors, such as the length of the trough 14, the throughput and the nature of material to be cleaned. For example one trough 14 may have agitators arranged at a different angle to those in another trough, thereby promoting more aggressive agitation or agitation over a longer time. The base of the trough 14 can be made in sections, to allow the user to alter the rake and pitch of its base and the agitators, so making the trough more usable for different applications and materials.

Figure 12:
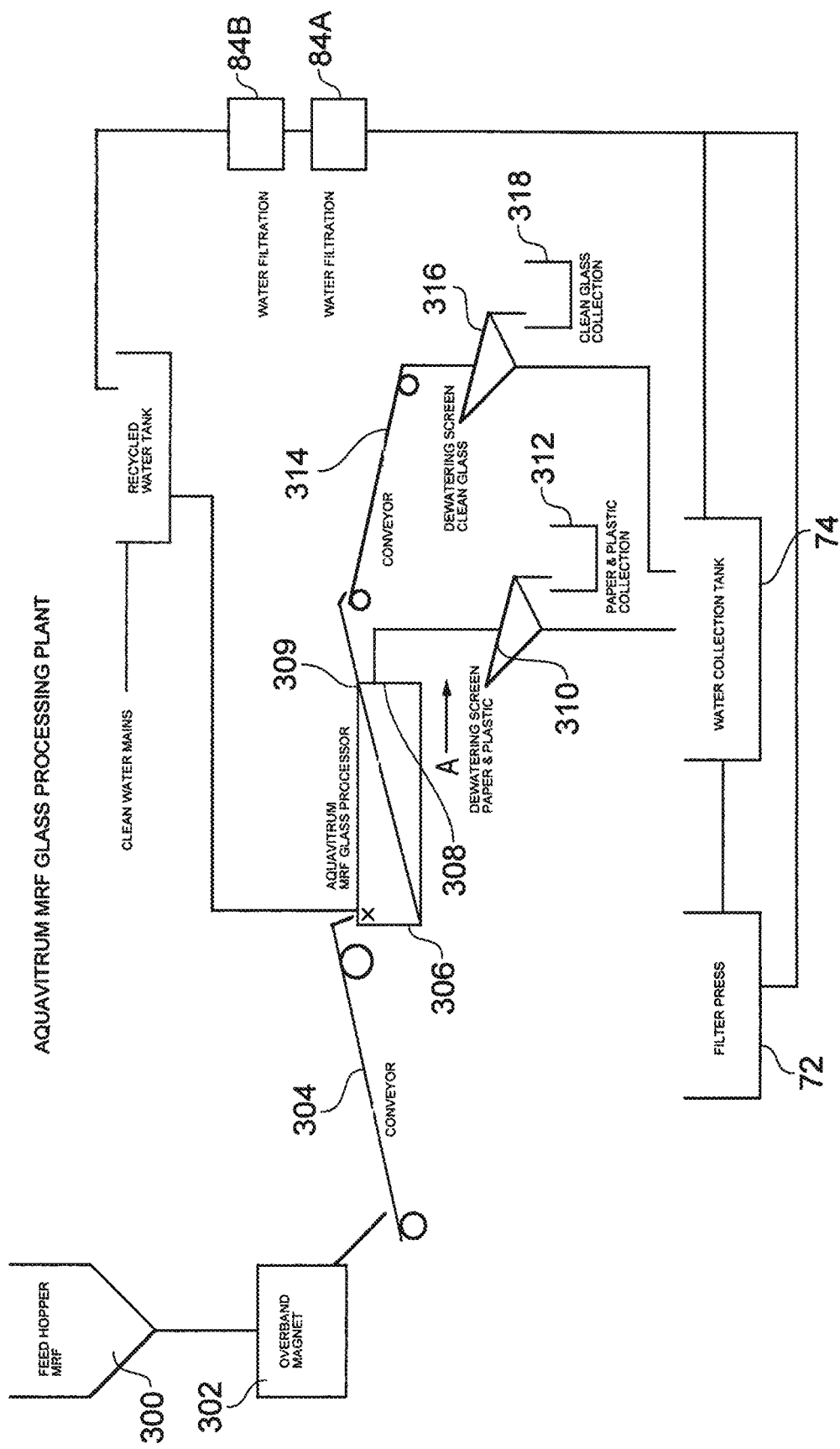
FIG. 12 illustrates a processing system for sorting clean glass cullet comprising an apparatus according to one embodiment of the invention.

Referring now to FIG. 12, which shows a side elevation view of a tank or trough 14 for cleaning contaminated glass or cullet 12, which is introduced at location X travels in direction A. This is typically contaminated with food/beverage waste, packaging, paper labels, plastics and metal lids and other unwanted debris. The rate of loading is between 25 kg/minute to 250 kg minute, or more in very large systems. Delivery of cullet is ideally by a conveyor 304, via a loading hopper 300 or this may be via a manual or mechanical shovel. Ideally dirty cullet 12 is dropped from a height via impact bars or an impact plate (not shown) so as to initiate and assist in breaking apart coagulated or congealed cullet 12.

Figure 5:
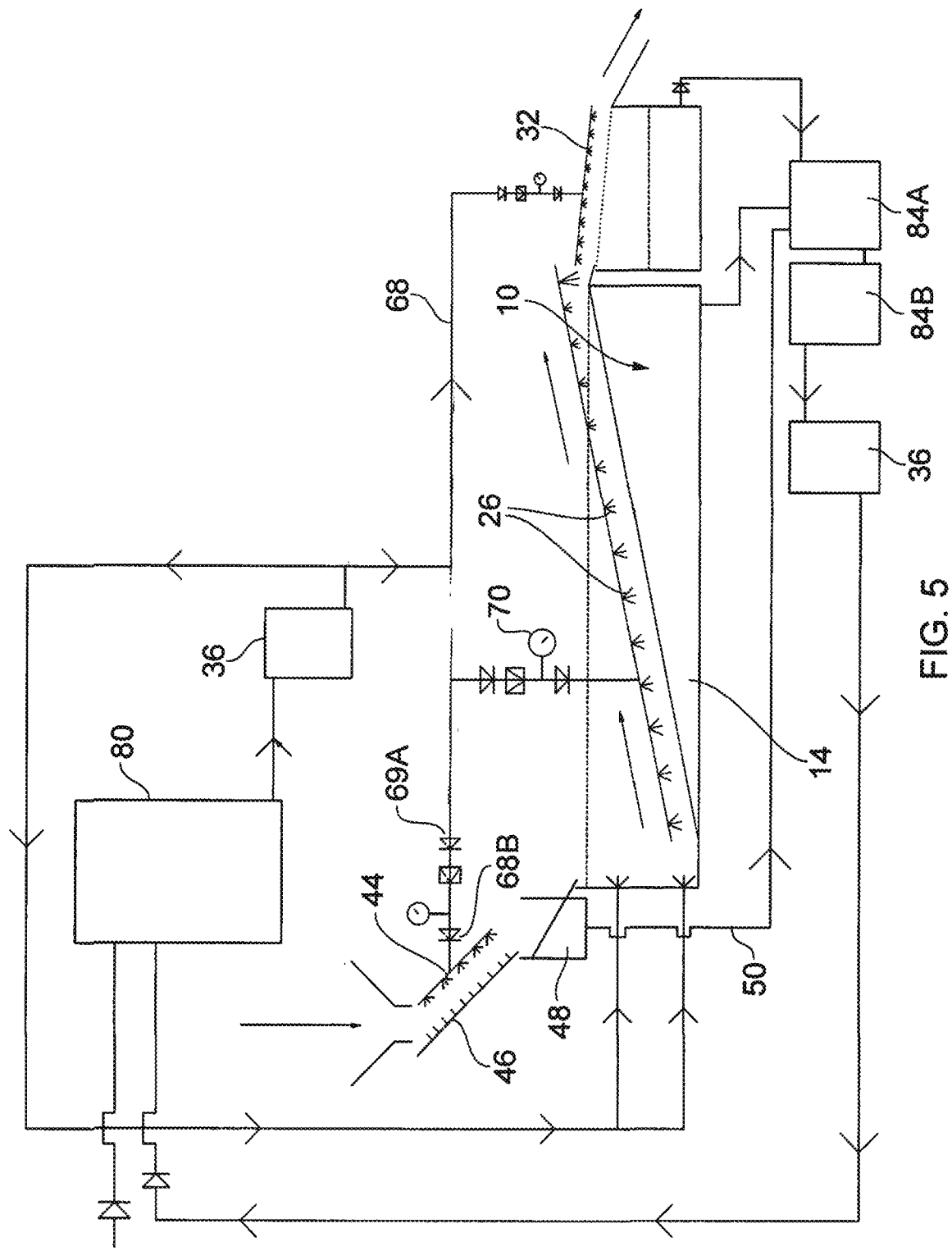
FIG. 5 shows a schematic view of system for cleaning contaminated glass.

Referring to FIG. 5 cullet 12 falls onto an agitating screen 46 where water jets 44 remove some detritus. Pre-washed cullet 12 then passes into a pre-wash catch tank 48 from where further dirty water is removed via a draw drain 50.

As the part washed cullet 12 enters the trough 14, as in other embodiments, water jets 201 and 202 initially impact the cullet and start to promote cleaning. A net water current travels in the direction A through the trough. The current A is relatively slow compared with the speed of water through the jets 201 and 202.

FIG. 4b is a plan view of an example of a layout of pipework to supply air bubbles to the base region of the trough and to disrupt banks of glass building up in such a way as to slow progress of glass through the trough 14 shown in FIG. 4a. Separate pipework 62 supplies pressurised water to the jets 201 and 202 (not shown in FIG. 4b).

FIG. 5 shows a schematic view of an alternative system 68 for cleaning contaminated glass; and shows that this system can be run on recycled water.

The grade of the water is not really important for the action of cleaning glass cullet, more for ensuring that pumps 36, jets 26, 27, 29 32, 201, 202 and valves 69a and 69b do not become clogged and so are less likely to require replacement.

Therefore once installed in a treatment plant, this system 68 is able to continue recycling the water.

As shown in FIG. 9, the apparatus may include a weir 69 located adjacent the drain. The weir 69 is arranged to control flow of liquid and/or washed cullet, through the apparatus. There may also be an exit gate located at the bottom of the trough 14.

Figure 6:
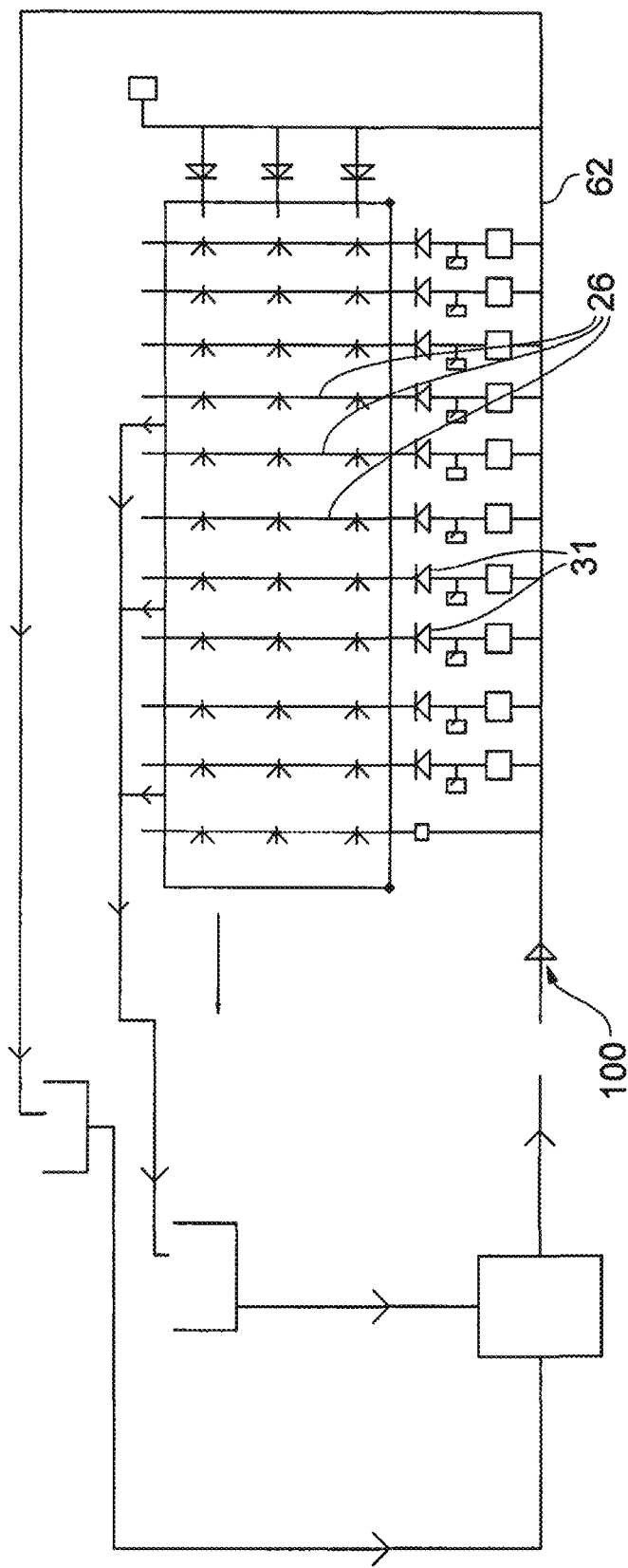
FIG. 6 shows a diagrammatical plan view of an example of a layout of pipework, jets, needle valves, isolation valves and a control system for use with a washing tank or trough.

FIG. 6 shows a diagrammatical plan view of an example of a layout of pipework 62, jets 26, needle valves, and or isolation valves 31 and a control system 100 for use with a washing tank or trough 14. Selective opening and closing of valves 31, by way of the control system 100, enables an operator to selectively activate certain regions of the trough 14. An advantage of this is that parts of a trough or cleaning system or cleaning plant can be isolated with respect to another part in order to enable a trough to be cleaned, whilst others continue to be deployed. This also facilitates maintenance and emergency shut-down, for example in the event of a breakdown.

FIG. 10a-c shows a layout of elongate members, such as manifolds 203 and 204, with jets 201 and 202. Manifolds can be isolated one from another. Elongate members, such as manifolds 204 and 204 can be regulated independently, with separate needle valves 31 to control the flow of water and pressure reducing valves to regulate and control a constant pressure. This can also be done using Gate valves/Isolation Valves, to regulate the flow of water. The ability to control the bulk through current is important in order to ensure stable and constant flow along channels, so as to promote abrasion of glass, whilst leaving a more stagnant volume of water closer to the surface, from where fine sprays 29 can 'sweep' debris.

Elongate members, such as manifolds 203 and 204 are optionally removable and can be relocated in different positions along the trough 14 so rendering the system more flexible and able to be used in different recycling plants. It is important to note that the maximum water 16 level is monitored and does not exceed a maximum limit (H) so as to ensure rubbish and debris does not return to mix with cullet 12 in trough 14.

Filters 72 and traps 74 are provided in order to ensure that the water stays clean. A settling tank 80 stores bulk volumes of water whilst permitting fine particles, sand and residue to settle to a sump from where it may be removed. A pump 36 system operates all the elongate members, such as manifolds 203 and 204 and jets 26, 27, 29, 32, 201 and 202 together and these can run with pressure gauges 70 for each elongate members, such as manifolds 203 and 204 and bypass valve (not shown). Pressure relief valves are provided for safety and flexibility.

The height of the trough 14 and the height of the water level (H) are important as this enables the debris to float upwards and come away from the glass. Jets and nozzles at the ends of the trough help to promote this higher current.

Once the debris or waste product has risen to the top of the water, the debris or waste gets forced down a drain or gutter connected to the apparatus, to be recycled via a dewatering screen or similar.

An aeration system FIGS. 4a and 4b may be included to a trough in order to pump air bubbles to regions of glass cullet so as to lift particles from the bottom of the trough and/or to disrupt and dislodge lighter debris and so assist it to float to the surface. Use of this aeration system may also assist heavy or coagulated debris to be disrupted or lifted from the lower region of the trough 14 whereat it is acted upon by under water jets 26, 201 and 202. Furthermore the aeration system is able to be configured so that water jets interact with aerated currents so as to further agitate cullet and particles.

Aeration may also help to reduce wear on lower surfaces of the trough and promote eddy currents and localised abrasion between pieces of cullet. These water bubbles help create a fizzing action, drawing the debris 22 to the surface of water 16. This aeration can also be regulated by isolation valves 75 and pressure reducing valves 76.

A sump (not shown) may be provided at a lower region of the trough to permit the removal of fines, such as sand, granular or other particles which may be build up due to accumulating in a 'dead space' where there is no current.

Referring now to FIGS. 7 and 8 there is shown upright blades or channel walls 34a that define channels for dividing the trough 14 into a series of parallel channels 34, optionally each having its own water jet 26 (shown on FIG. 8) and series of agitators 28 deployed at location on the base of the channel 34. These narrower channels are able to promote more aggressive local mixing and abrasion and so help clean the glass more quickly.

Another advantage of the needle valves or isolation valves is that they may be operated (opened/closed/shutdown) independently of one another, and so permit on-line maintenance and inspection whilst other channels 34 are operating. In FIG. 8, which is an end view of the blades shown in FIG. 7, the location of water jets 26 is shown and it is illustrated how the height of blades is varied by attaching an extension plate 11 to create higher walls.

FIG. 9 is an overall diagrammatical side elevation view of an alternative embodiment of a glass cleaning apparatus 10 in the form of a tank or trough 14 and in which like parts bear the same reference numerals as the other Figures.

FIG. 5 shows a cold water silo 80 acts as a settling tank and is connected to a pressure pump 36 from where water is pumped around pipework to an elongate member, such as manifolds 203 and 204 and through water jets 26, 32, 201 and 202. Additional water filtration tanks 84a and 84b received water that has been used to wash glass cullet.

Pressure gauges 70 monitor water pressure and are connected to controller and alarms (not shown) in the event of an over-pressurisation event. The system shown in FIG. 5 is integrated to the extent that pre-washing occurs when cullet passes over the agitating screen 46 and is subjected to spraying from the spray manifold 44; then cullet passes through the trough 14; and finally cleaned cullet is subjected to rinsing by rinsing sprays 32.

Figure 11D:
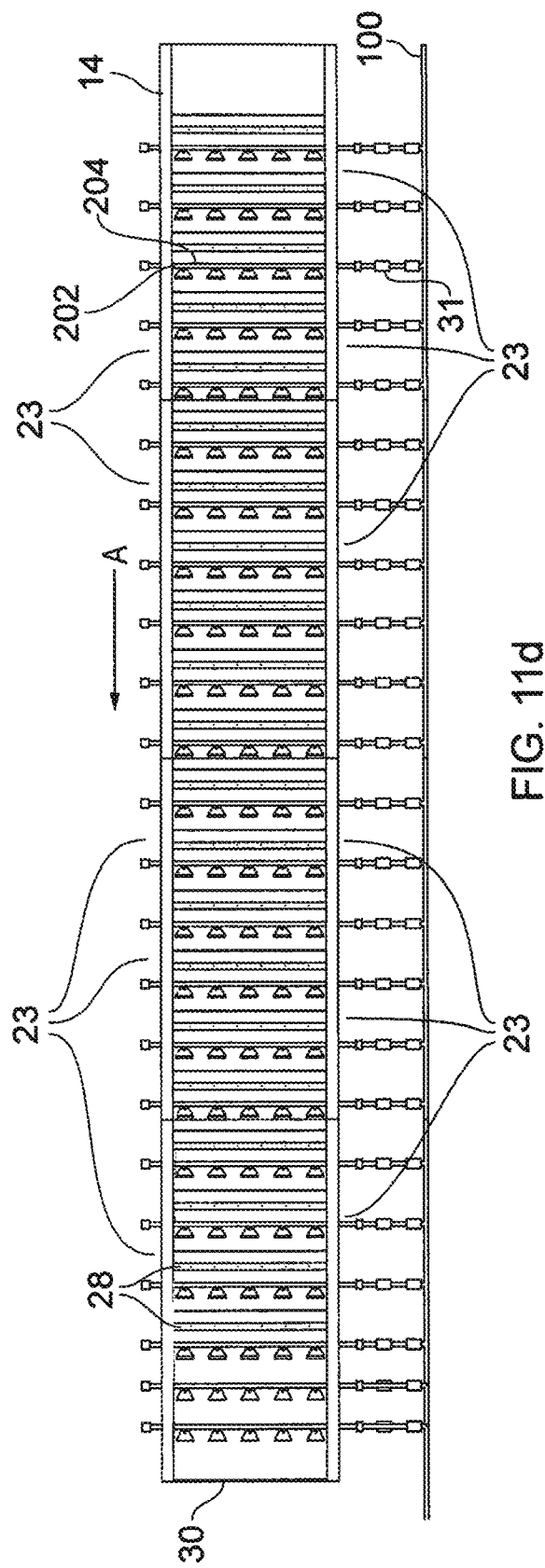
FIG. 11d illustrates a view from above of the apparatus of FIGS. 11a to 11c.

As shown in detail in FIGS. 10 to 11d, the apparatus comprises a first band or group of jets 201 arranged to direct pressurised liquid at the contaminated aggregate in order to agitate the contaminated aggregate against a surface thereby promoting separation of cleaned aggregate. The first bank or group of jets 201 is arranged in a predominantly downward direction so that the jets are directed towards the bottom of the channel 14 in order to agitate the aggregate. The apparatus further comprises a second bank or group of jets 202 arranged to direct and/or urge the debris 22 in an upward direction towards a drainage outlet 23.

The first bank or group of jets 201 are arranged within an array comprising a plurality of spaced apart rows of first jets 201. The jets 201 within each row are arranged to be spaced apart from each other from a first side of the trough to a second opposed side of the trough. The jets 201 within each row are spaced apart from each other in a direction extending transverse to, for example substantially perpendicular to, the length of the channel(s) 14. The first jets 201 within each row are in fluid communication with an elongate member, such as a manifold 203 extending between the pair of opposed sides of the trough.

The pump 36, provides a constant pressure of a liquid, such as water, using needle valves or isolation valves 31, depending on the aggregate being cleaned. This can also be used with Air FIGS. 4a and 4b. Each elongate member, such as a manifold may have a fluid dynamic water pressure of between 50-300 psi (3.34-20.69 bar), this maybe increased depending on the aggregate being cleaned. Each jet 201 and 202, ideally, when steady state conditions are met, has a constant dynamic flow and pressure, to enable accurate and constant flow rate of liquid, such as water to force the contaminated aggregate through the trough 14 in direction A. Both elongate members 203 and 204, such as a manifold and jets 201 and 202, can have different pressures, depending on the type and nature of aggregate being cleaned.

As shown in FIGS. 11b and 11c, the first jets 201 may be arranged to be rotatable about an axis extending transverse to the length of the channel 14. One or more, for example each, of the first jets 201 may be rotatable about the longitudinal axis of the first elongate member, such as manifold 203. The first jets 201 within each row may be collectively rotatable about the longitudinal axis of the elongate member, such as a manifold 203. Alternatively, each first jet 201 within each row may be arranged to be individually rotatable about the longitudinal axis of the elongate member, such as a manifold 203. The angle of each jet within the row, or of all the jets within the row, may be selectively varied in order to alter the angle with which the liquid impinges the flow of liquid within the channel 14.

The second bank or group of jets 202 are arranged within an array comprising a plurality of spaced apart rows of second jets 202. The jets 202 within each row are arranged to be spaced apart from each other from a first side of the trough to a second opposed side of the trough. The jets 202 within each row are spaced apart from each other in a direction extending transverse to, for example substantially perpendicular to, the length of the channel(s) 14. The second jets 202 within each row are in fluid communication with a second elongate member, such as a manifold 204 extending between the pair of opposed sides of the trough.

Referring again to FIGS. 11b and 11c, the second jets 202 may be arranged to be rotatable about an axis extending transverse to the length of the channel 14. One or more, for example each, of the second jets 202 may be rotatable about the longitudinal axis of the second elongate member, such as a manifold 204. The second jets 202 within each row may be collectively rotatable about the longitudinal axis of the second elongate member, such as a manifold 204. Alternatively, each second jet 202 within each row may be arranged to be individually rotatable about the longitudinal axis of the elongate member, such as a manifold 204. The angle of each jet within the row, or of all the jets within the row, may be selectively varied in order to alter the angle with which the liquid impinges the flow of liquid within the channel 14.

Each row of jets 201, 202 within each of the arrays is spaced apart from an adjacent row of corresponding jets 201, 202 along the length of the channel 14. As shown in FIGS. 11a to 11c, each row of second jets 202 is displaced in a more upward direction from the corresponding row of first jets 201.

The array of the first bank or groups of jets 201 may be aligned with the array of the second bank or groups of jets 202. For example, each first elongate member, such as a manifold 203 of the first array of the first jets 201 may be aligned with a second elongate member, such as a manifold 204 of the array of the second jets 202. For example, each first jet 201 may be aligned with a second jet 202.

Referring to FIG. 12, the contaminated aggregate, for example contaminated glass cullet, is fed into a feed hopper 300. The contaminated glass cullet is fed through an overband magnet 302 to remove any magnetic material. The remaining contaminated glass cullet is then fed onto conveyor 304. The conveyor 304 passes the contaminated glass cullet into the apparatus 306 of the present invention. The contaminated glass cullet is fed into the channel(s) containing liquid.

A first bank or group of jets (not shown) is arranged to direct pressurised liquid at the contaminated glass cullet in order to agitate the contaminated cullet against a surface thereby promoting separation of cleaned aggregate from contaminated cullet. The surface may for example be any surface of the channel and/or trough. Furthermore, the cullet may be agitated against other pieces of cullet thereby promoting separation of debris. A second bank or group of jets (not shown) is arranged to direct and/or urge the debris 22 to a drainage outlet. Light material floats on the surface of the liquid and is removed by drain 308. The light material is filtered through filter 310 to separate paper and plastics debris which is collected in receptacle 312.

The cleaned cullet is urged along towards the exit 309 of the trough. The cleaned cullet is sprayed by additional water jets located at or adjacent the exit of the trough to remove any remaining debris. The cleaned cullet passes onto second conveyor 314 and passes onto a second filter 316 arranged to separate the cleaned glass from the cullet. The cleaned glass is collected in glass receptacle 318.

The liquid, for example water, collected during the filtration of the paper and plastics residue and from the filtration of the cleaned glass cullet is filtered and recycled for further use with the apparatus.

The invention has been described by way of examples only and it will be appreciated that variation may be made to the above-mentioned embodiments without departing from the scope of invention. For example, the jets may provide any suitable fluid, such as for example pressurised gas, so as to provide for example an air knife directed towards the liquid within the channel(s).

The invention claimed is:

1. An apparatus for cleaning contaminated aggregate comprising:
    at least one channel arranged in use to receive a liquid containing contaminated aggregate, the at least one channel having a base comprising agitators spaced along the length of the at least one channel;
    a first bank or group of at least one nozzle; and
    a second bank or group of at least one nozzle;
    wherein the first bank or group of the at least one nozzle is spaced along the channel and arranged to direct jets of pressurized fluid angled in a generally downward direction to impact the contaminated aggregate in order to force the contaminated aggregate against and over the agitators along the length of the at least one channel to a first outlet thereby agitating the aggregate and promoting separation of aggregate from debris; and
    wherein the second bank or group of the at least one nozzle is arranged to direct and/or urge debris to a second outlet;
    wherein the base of the channel and the agitators remain stationary while the aggregate is urged along the base of the channel and over the agitators by the jets of pressurized fluid.

2. The apparatus as claimed in claim 1, wherein the aggregate is glass cullet.

3. The apparatus as claimed in claim 1, wherein the fluid is water.

4. The apparatus as claimed in claim 1, wherein the at least one channel is provided within at least one trough, and is/are located at or adjacent a lower region or on the bottom of the at least one trough.

5. The apparatus as claimed in claim 4, in which the at least one channel is removable from the at least one trough.

6. The apparatus as claimed in claim 1, wherein the at least one channel is shaped to direct fluid jets towards the lower region or bottom of the at least one channel or trough.

7. The apparatus as claimed in claim 1, wherein the at least one channel has a substantially V-shaped or U-shaped cross-section.

8. The apparatus as claimed in claim 1, wherein the dimensions and/or angle of the at least one channel is adjustable.

9. The apparatus as claimed in claim 1, further comprising at least one weir and/or dam, or any combination thereof.

10. The apparatus as claimed in claim 1, wherein at least one bank or group of at least one jet is located adjacent or above the surface of the liquid in use.

11. The apparatus as claimed in claim 10, wherein the at least one bank or group of at least one jet is the first bank or group of at least one jet.

12. The apparatus as claimed in claim 10, wherein at least one bank or group of at least one jet is arranged to be directed at an angle to the main direction of flow of the liquid.

13. The apparatus as claimed in claim 12, wherein the at least one bank or group of at least one jet is the second bank or group of jets.

14. The apparatus as claimed in any preceding claim 1, wherein at least one bank or group of at least one jet is located below a surface of the liquid in use.

15. The apparatus as claimed in claim 14, wherein the at least one bank or group of at least one jet is the second bank or group of jets.

16. The apparatus as claimed in claim 15, wherein the second bank or group of at least one jet located below the surface of the liquid is located within the lower region or adjacent the bottom of the at least one channel.

17. The apparatus as claimed in claim 1, wherein the first bank or group of at least one jet is arranged to direct pressurized fluid in a generally downward direction so as to agitate the contaminated aggregate; and wherein the second bank or group of at least one jet is arranged to direct pressurized fluid in a generally upward direction so as to promoting a current through the at least one channel.

18. The apparatus as claimed in claim 1, wherein the at least one bank or group of at least one jet is fan-shaped.

19. The apparatus as claimed in claim 1, wherein the first bank or group of at least one jet is offset from the second bank or group of at least one jet.

20. The apparatus for washing contaminated aggregate according to claim 1, wherein at least one baffle is provided within the at least one channel.

21. An apparatus for washing contaminated aggregate comprising:
at least one channel arranged in use to receive a liquid containing contaminated aggregate, the channel having a base comprising agitators spaced along the length of the channel;
a plurality of nozzles spaced along the length of the channel and arranged to direct jets of pressurized fluid angled in a generally downward direction to impact the contaminated aggregate in order to agitate the contaminated aggregate thereby promoting separation of aggregate from debris and contaminate and urging the aggregate over and against the agitators and through the at least one channel; and
a means for removing the debris and contaminate from the surface of the liquid;
wherein the base of the channel and the agitators remain stationary while the aggregate is urged along the base of the channel and over the agitators by the jets of pressurized fluid.

22. The apparatus as claimed in claim 21, wherein a first and a second banks or groups of jets are arranged to be regulated independently of each other.

23. The apparatus as claimed in claim 22, wherein the apparatus further comprises one or more of needle valve, pressure reducing valve and/or isolating valve, or any combination thereof for regulation of the first and/or second bank or group of jets.

24. The apparatus as claimed in claim 23, wherein at least one valve is associated with each bank or group of jets.

25. The apparatus as claimed in claim 21, further comprising means for removing contaminate from the surface of the liquid, in which the means for removing contaminate comprises at least one of a deflector; a fan; fine spray; or blower, or any combination thereof.

26. The apparatus as claimed in claim 21, wherein the at least one channel is deployed at an angle to the horizontal.

27. The apparatus as claimed in claim 21, wherein a means is provided to vary a flow rate of fluid through at least one bank or group of jets.

28. The apparatus as claimed in claim 21, in which the orientation of at least one bank or group of jets is variable with respect to the at least one channel.

29. The apparatus as claimed in claim 21, further comprising an aeration system below the water surface for promoting disruption of aggregate.

30. The apparatus as claimed in claim 21, further comprising a vibrating tray is provided for promoting abrasion between aggregate particles.

31. The apparatus as claimed in claim 21, further comprising a mesh for collecting debris.

32. The apparatus as claimed in claim 21, further comprising a metal recovery system.

33. The apparatus as claimed in claim 32, wherein the metal recovery system includes an electro-magnet.

34. The apparatus as claimed in claim 21, further comprising a pre-wash system for cleaning contaminated aggregate prior to entry of the aggregate into the trough.

35. The apparatus according to claim 34 wherein the pre-wash system includes: a glass cullet delivery system and/or a spray manifold and/or a pre-wash catch tank and/or a draw drain.

36. The apparatus according to claim 21, wherein the agitators are provided on a lower region of the trough for promoting mixing.

37. The apparatus according to claim 36 wherein the agitators are movable.

38. The apparatus according to claim 36 wherein the agitators are adapted to be removed and replaced.

39. An apparatus for cleaning contaminated aggregate comprising:
at least one channel arranged in use to receive a liquid containing contaminated aggregate, the at least one channel having a base comprising agitators spaced along the length of the at least one channel;
a first bank or group of at least one nozzle; and
a second bank or group of at least one nozzle;
wherein the first bank or group of the at least one nozzle is spaced along the channel and arranged to direct jets of pressurized fluid angled in a generally downward direction to impact the contaminated aggregate in order to force the contaminated aggregate against and over the agitators along the length of the at least one channel to a first outlet thereby agitating the aggregate and promoting separation of aggregate from debris; and
wherein the second bank or group of the at least one nozzle is arranged to direct and/or urge debris to a second outlet;
wherein the agitators remain in substantially the same position with respect to the nozzles while the aggregate is urged along the base of the channel and over the agitators by the jets of pressurised fluid.

40. An apparatus for washing contaminated aggregate comprising:
at least one channel arranged in use to receive a liquid containing contaminated aggregate, the channel having a base comprising agitators spaced along the length of the channel;
a plurality of nozzles spaced along the length of the channel and arranged to direct jets of pressurized fluid angled in a generally downward direction to impact the contaminated aggregate in order to agitate the contaminated aggregate thereby promoting separation of aggregate from debris and contaminate and urging the aggregate over and against the agitators and through the at least one channel; and
a means for removing the debris and contaminate from the surface of the liquid;
wherein the agitators remain in substantially the same position with respect to the nozzles while the aggregate is urged along the base of the channel and over the agitators by the jets of pressurised fluid.

* * * * *